US012576830B2

(12) United States Patent

Sano et al.

(10) Patent No.: US 12,576,830 B2
(45) Date of Patent: Mar. 17, 2026

(54) CONTROLLER OF VEHICLE AND VEHICLE INCLUDING SAME

(71) Applicant: KAWASAKI MOTORS, LTD., Akashi (JP)

(72) Inventors: Katsuya Sano, Akashi (JP); Shohei Terai, Kobe (JP)

(73) Assignee: KAWASAKI MOTORS, LTD., Akashi (JP)

( * ) Notice: Subject to any disclaimer, the term of this patent is extended or adjusted under 35 U.S.C. 154(b) by 120 days.

(21) Appl. No.: 18/390,888

(22) Filed: Dec. 20, 2023

(65) Prior Publication Data

US 2024/0208485 A1     Jun. 27, 2024

(30) Foreign Application Priority Data

Dec. 22, 2022     (JP) ................................. 2022-205121

(51) Int. Cl.
*B60W 10/10*          (2012.01)
*B60W 10/02*          (2006.01)
          (Continued)

(52) U.S. Cl.
CPC ............ *B60W 20/30* (2013.01); *B60W 10/02* (2013.01); *B60W 10/06* (2013.01); *B60W 10/08* (2013.01); *B60W 10/10* (2013.01); *B60W 2300/36* (2013.01); *B60W 2510/02* (2013.01); *B60W 2510/0241* (2013.01); *B60W 2510/10* (2013.01); *B60W 2540/10* (2013.01);
          (Continued)

(58) Field of Classification Search
CPC ...... B60W 10/10; B60W 30/19; B60W 10/02; B60W 10/06; B60W 10/08; B60W 2540/10; B60W 2510/0241; B60W 2710/06; B60W 2710/021; B60W 2710/025; B60W 2710/08; B60W 2710/1005
USPC ..................... 701/54, 51; 477/5, 109, 77, 80
See application file for complete search history.

(56)                References Cited

U.S. PATENT DOCUMENTS 5,337,848 A * 8/1994 Bader ................... B60W 10/08
                                                  903/909
2003/0027683 A1 2/2003 Grillenberger et al.
                    (Continued)

FOREIGN PATENT DOCUMENTS

EP          2098753 A1     9/2009
JP       2009264519 A     11/2009

*Primary Examiner* — Roger L Pang
(74) *Attorney, Agent, or Firm* — Alleman Hall LLP

(57)                ABSTRACT

Processing circuitry included in a controller is configured to: when the processing circuitry acquires a shift command by which a first gear stage is shifted to a second gear stage, execute transmission rate reducing control of controlling a clutch actuator such that a power transmission rate is reduced; after the transmission rate reducing control is executed, execute shift control of controlling a shift actuator such that a transmission gear pair corresponding to the first gear stage and engaging structures corresponding to the first gear stage are disengaged from each other, and a transmission gear pair corresponding to the second gear stage and engaging structures corresponding to the second gear stage are engaged with each other; and after the shift control is executed, execute transmission rate increasing control of controlling the clutch actuator such that the power transmission rate is increased.

12 Claims, 6 Drawing Sheets

(51) Int. Cl.
    *B60W 10/06*       (2006.01)
    *B60W 10/08*       (2006.01)
    *B60W 20/30*       (2016.01)

(52) U.S. Cl.
    CPC ... *B60W 2710/021* (2013.01); *B60W 2710/06*
        (2013.01); *B60W 2710/08* (2013.01); *B60W*
                        *2710/1005* (2013.01)

(56)                   References Cited

U.S. PATENT DOCUMENTS

| | | | |
|---|---|---|---|
| 2007/0240955 A1 | 10/2007 | Zenno | |
| 2007/0243973 A1* | 10/2007 | Minami | B60W 30/19 |
| | | | 477/109 |
| 2008/0207393 A1* | 8/2008 | Minami | F16D 48/06 |
| | | | 477/77 |
| 2009/0270224 A1 | 10/2009 | Minami | |
| 2020/0292015 A1* | 9/2020 | Matsuda | B60W 10/02 |
| 2021/0001707 A1 | 1/2021 | Nishiyabu et al. | |

* cited by examiner

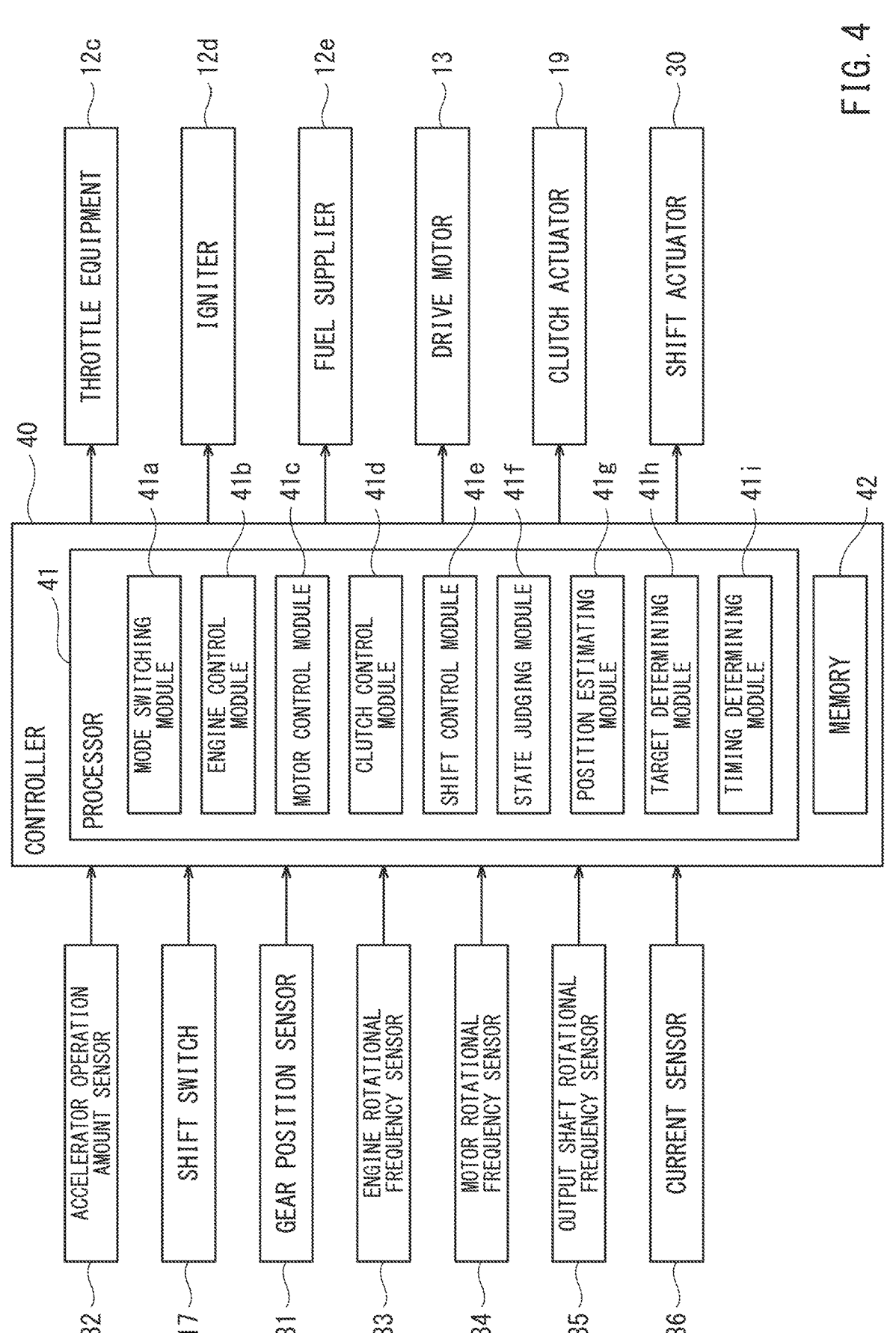
F I G. 4

CONTROLLER OF VEHICLE AND VEHICLE INCLUDING SAME

CROSS-REFERENCE TO RELATED APPLICATIONS

This application claims priority to and the benefit of Japanese Patent Application No. 2022-205121 filed on Dec. 22, 2022, the entire disclosure of which is incorporated herein by reference.

BACKGROUND OF THE INVENTION

Field of the Invention

The present disclosure relates to a controller of a vehicle and a vehicle including a controller.

Description of the Related Art

Japanese Laid-Open Patent Application Publication No. 2009-264519 discloses a motorcycle including a dog gear transmission. The gear transmission includes: transmission gears located on an input shaft; and transmission gears located on an output shaft and meshing with the transmission gears located on the input shaft. At the time of the gear change, the transmission gear corresponding to a gear stage newly set by a gear change command is moved to an engaging position and is engaged with a dog, and the other transmission gears are made to return to non-engaging positions. Thus, the gear that transmits torque of an engine to a rear wheel is switched.

In a vehicle including a transmission, shock may be generated at the time of the engagement of a dog. A reduction in gear shift shock is desired depending on the situation.

SUMMARY OF THE INVENTION

An object of the present disclosure is to provide a controller of a vehicle and a vehicle including a controller, each of which can realize a reduction in shock generated by gear change.

To solve the above problem, a controller of a vehicle according to one aspect of the present disclosure is a controller of a vehicle, the vehicle including: a driving source that generates power; a driving wheel; a gear transmission located on a power transmitting path through which the power is transmitted between the driving source and the driving wheel, the gear transmission including an input shaft, an output shaft, and transmission gear pairs each including a transmission gear coaxial with the input shaft and a transmission gear coaxial with the output shaft; a shift actuator that moves engaging structures engageable with the transmission gear pairs and sets one transmission gear pair, which has been engaged with the engaging structures, among the transmission gear pairs to a power transmitting state; a clutch that is located on the power transmitting path and between the driving source and the input shaft and changes a power transmission rate of the power transmitted from the driving source to the input shaft; and a clutch actuator that operates the clutch. The controller includes processing circuitry configured to when the processing circuitry acquires a shift command by which a first gear stage is shifted to a second gear stage, execute transmission rate reducing control of controlling the clutch actuator such that the power transmission rate is reduced, after the transmission rate reducing control is executed, execute shift control of controlling the shift actuator such that the transmission gear pair corresponding to the first gear stage and the engaging structures corresponding to the first gear stage are disengaged from each other, and the transmission gear pair corresponding to the second gear stage and the engaging structures corresponding to the second gear stage are engaged with each other, and after the shift control is executed, execute transmission rate increasing control of controlling the clutch actuator such that the power transmission rate is increased.

A vehicle according to one aspect of the present disclosure includes the driving source, the driving wheel, the gear transmission, the shift actuator, the clutch, the clutch actuator, and the controller.

The above object, other objects, features, and advantages of the present disclosure will be made clear by the following detailed explanation of preferred embodiments with reference to the attached drawings.

BRIEF DESCRIPTION OF THE DRAWINGS

FIG. 4 is a block diagram showing the controller and its inputs and outputs.

DETAILED DESCRIPTION

Hereinafter, embodiments will be described with reference to the drawings.

Figure 1:
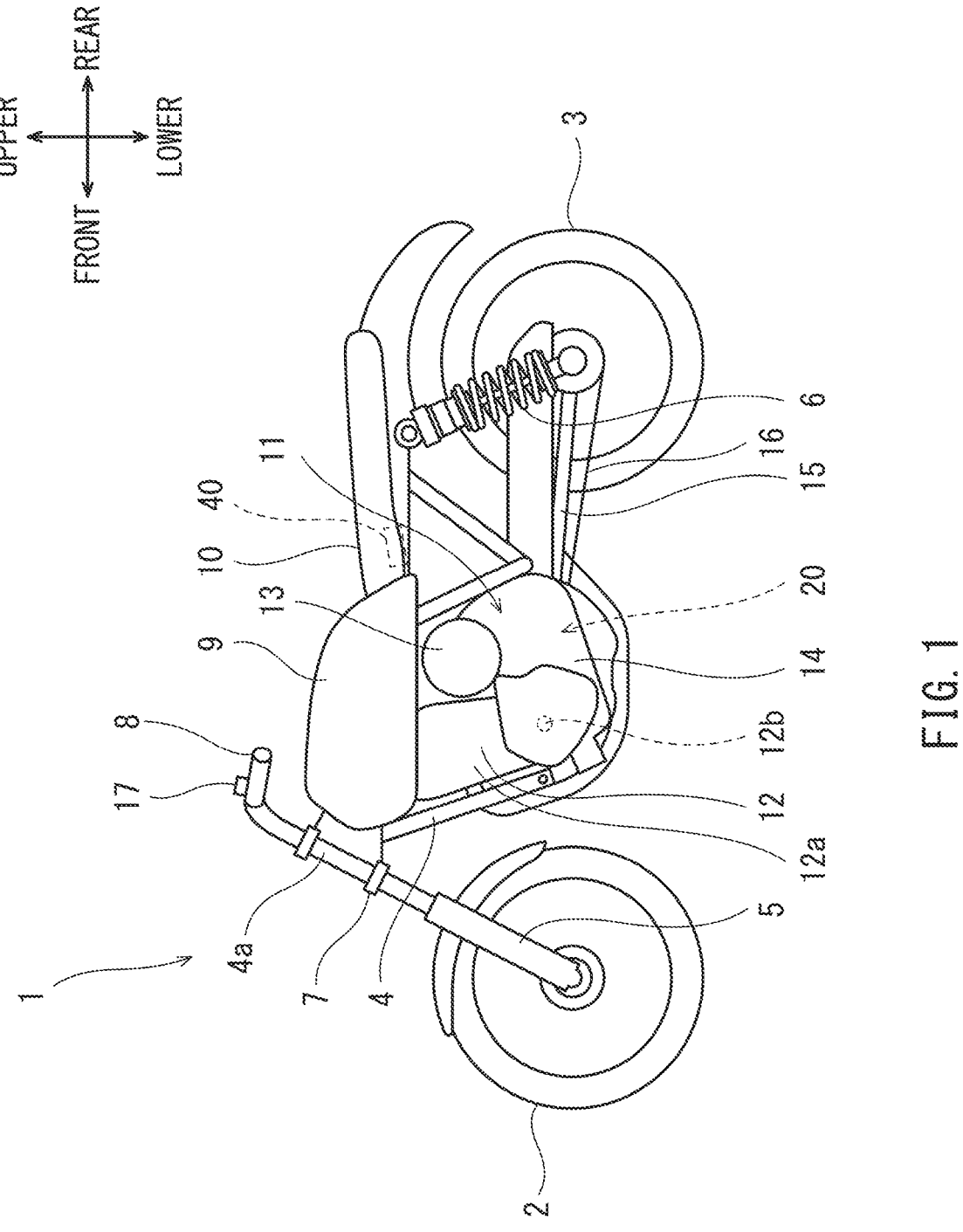
FIG. 1 is a left side view of a motorcycle including a controller according to one embodiment.

FIG. 1 is a left side view of a motorcycle 1 including a controller 40 according to one embodiment. The motorcycle 1 is one example of a straddled vehicle straddled by a rider, and is a hybrid vehicle. Directions described below are based on directions from the viewpoint of the rider of the motorcycle 1. A front-rear direction corresponds to a vehicle longitudinal direction, and a left-right direction corresponds to a vehicle width direction.

The motorcycle 1 includes a front wheel 2, a rear wheel 3, a vehicle body frame 4, a front suspension 5 connecting the front wheel 2 to a front portion of the vehicle body frame 4, and a rear suspension 6 connecting the rear wheel 3 to a rear portion of the vehicle body frame 4. The front wheel 2 is a driven wheel, and the rear wheel 3 is a driving wheel. The front suspension 5 is coupled to a bracket 7 located away from the front suspension 5 in an upper-lower direction. A steering shaft connected to the bracket 7 is supported by a head pipe 4a so as to be angularly displaceable. The head pipe 4a is part of the vehicle body frame 4. A handlebar 8 held by hands of the rider is located at the steering shaft. A fuel tank 9 is located behind the handlebar 8. A seat 10 on which the rider is seated is located behind the fuel tank 9.

A swing arm 15 is supported by the vehicle body frame 4 so as to be angularly displaceable. The swing arm 15 supports the rear wheel 3 and extends in the front-rear direction. Moreover, a power unit 11 is mounted on the vehicle body frame 4 so as to be located between the front wheel 2 and the rear wheel 3. The power unit 11 includes a first driving source and a second driving source that are two traveling driving sources (also called prime movers) that generate power. The first driving source is an engine 12 that is an internal combustion engine. The second driving source is a drive motor 13 that is an electric motor.

The engine 12 includes a cylinder 12a and a crank shaft 12b coupled to a piston in the cylinder 12a. The crank shaft 12b of the engine 12 is accommodated in a crank case 14. Moreover, a gear transmission 20 is located behind the engine 12. The gear transmission 20 is accommodated in the crank case 14. A shift switch 17 is located at a left grip of the handlebar 8. The shift switch 17 changes a gear stage that is a shift position of the gear transmission 20. The controller 40 is located under the seat 10. The controller 40 controls the engine 12, the drive motor 13, a below-described clutch actuator 19, and a below-described shift actuator 30.

Figure 2:
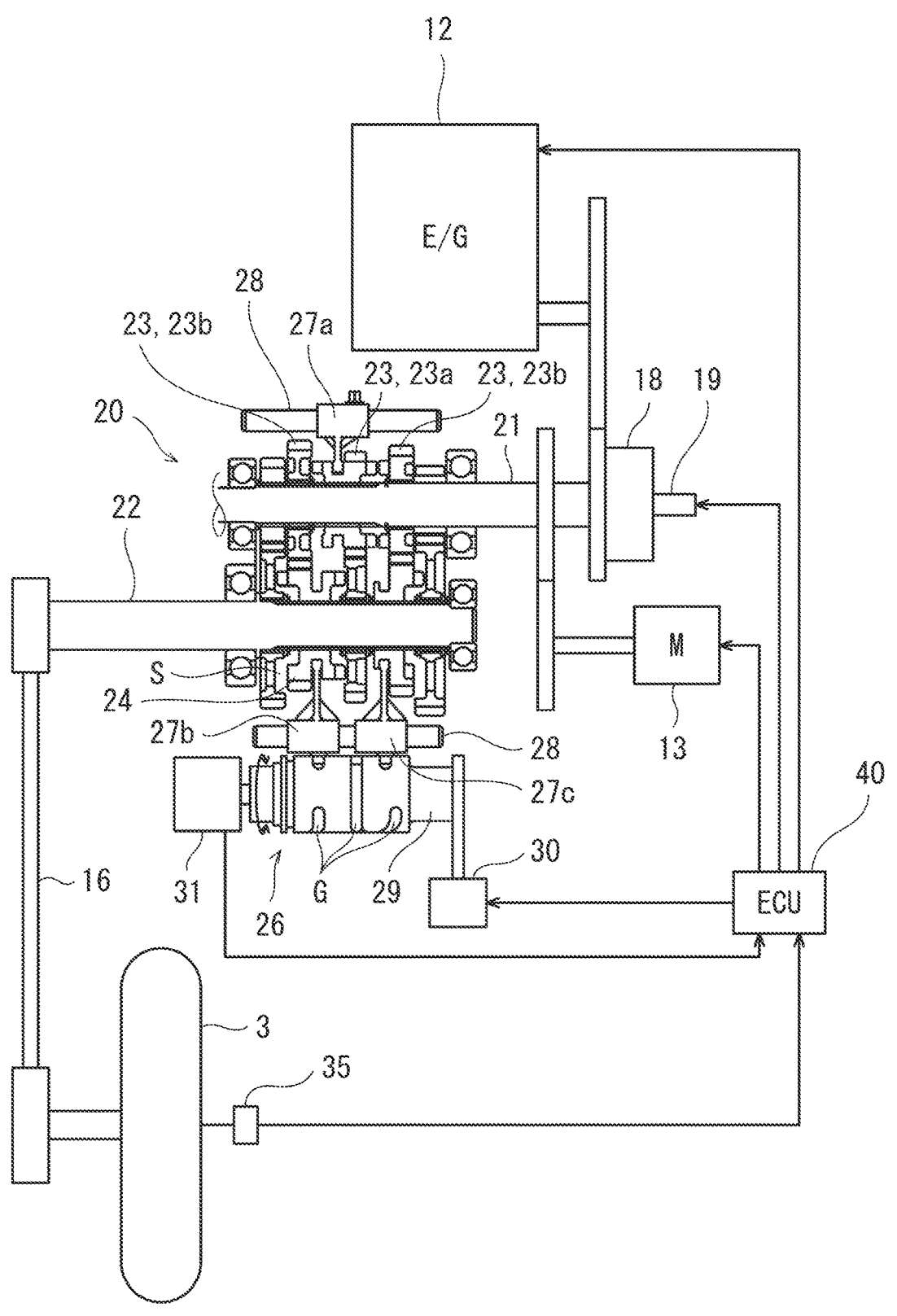
FIG. 2 is a schematic diagram of a power system of the motorcycle of FIG. 1.

FIG. 2 is a schematic diagram of a power system of the motorcycle 1 of FIG. 1. The gear transmission 20 includes an input shaft 21, an output shaft 22, and transmission gear pairs 23. At least one of driving power of the first driving source and driving power of the second driving source can be transmitted to the input shaft 21.

Specifically, the gear transmission 20 is located on an engine power transmitting path through which the power is transmitted between the engine 12 that is the first driving source and the rear wheel 3 that is the driving wheel. A main clutch 18 is interposed on the engine power transmitting path so as to be located between the engine 12 and the input shaft 21 of the gear transmission 20. In the following description, the main clutch 18 may be simply referred to as the clutch 18. Rotational power of the crank shaft 12b of the engine 12 is input to the input shaft 21 through the main clutch 18.

Moreover, the gear transmission 20 is located on a motor power transmitting path through which the power is transmitted between the drive motor 13 that is the second driving source and the rear wheel 3 that is the driving wheel. The main clutch 18 is not located on the motor power transmitting path. To be specific, the drive motor 13 that is the second driving source is connected to the input shaft 21 so as to transmit the power to the input shaft 21 without through the main clutch 18. The rotational power of a rotating shaft of the drive motor 13 is input to the input shaft 21. To be specific, in the present embodiment, both of the engine 12 that is the first driving source and the drive motor 13 that is the second driving source can simultaneously transmit the power to the input shaft 21.

The main clutch 18 is driven by the clutch actuator 19 and cuts or establishes the engine power transmitting path. In the present embodiment, the main clutch 18 is realized by a friction clutch.

A disengaged state of the main clutch 18 denotes a state where the power is not transmitted between the engine 12 and the input shaft 21 of the gear transmission 20. An engaged state of the main clutch 18 denotes a state where the power is completely transmitted between the engine 12 and the input shaft 21. The main clutch 18 changes from the disengaged state to the engaged state through a half-engaged state. The half-engaged state of the main clutch 18 denotes a state where the power is partially transmitted between the engine 12 and the input shaft 21.

The clutch actuator 19 is an actuator that changes the degree of engagement of the main clutch 18, i.e., a power transmission rate that is a transmission rate of the power transmitted from the engine 12 to the input shaft 21. The power transmission rate of the main clutch 18 is a value that increases as frictional force generated at the main clutch 18 increases. The disengaged state of the main clutch 18 denotes a state where the power transmission rate of the main clutch 18 is 0%. The engaged state of the main clutch 18 denotes a state where the power transmission rate of the main clutch 18 is 100%. The half-engaged state of the main clutch 18 denotes a state where the power transmission rate of the main clutch 18 is more than 0% and less than 100%.

In other words, the main clutch 18 includes a pair of contact members that can be engaged with each other and disengaged from each other, and the main clutch 18 can transmit the rotational power from one of the contact members to the other by the frictional force generated between the pair of contact members. One of the pair of contact members is a rotating body located close to the engine 12 that is the first driving source, and the other is a rotating body located close to the input shaft 21. The pair of contact members may be called a clutch plate and a friction plate. The engaged state of the main clutch 18 denotes a state where the rotational power is transmitted without the occurrence of slipping between the pair of contact members. Moreover, the half-engaged state of the main clutch 18 denotes a state where the rotational power is transmitted while causing the slipping between the pair of contact members.

The clutch actuator 19 generates fastening power by which the pair of contact members of the clutch 18 are engaged with each other. The main clutch 18 transmits power transmitting torque corresponding to the fastening power. A state where the fastening power is more than zero and less than a predetermined upper limit may be referred to as the half-engaged state. In this case, when input torque that exceeds the power transmitting torque generated in accordance with the fastening power is transmitted from the driving source to one of the contact members, the power transmitting torque corresponding to the fastening power is transmitted from this contact member to the other contact member, and the slipping occurs between the pair of contact members in accordance with the rest of the input torque. Moreover, when input torque that is less than the power transmitting torque generated in accordance with the fastening power is transmitted from the driving source to one of the contact members, the slipping does not occur even in the half-engaged state, and the input torque itself is transmitted from this contact member to the other contact member.

When the power is transmitted from the driving source to the driving wheel, the rotating body of the clutch 18 which is located close to the first driving source may be referred to as an "upstream rotating body of the clutch," and the rotating body of the clutch 18 which is located close to the input shaft 21 may be referred to as a "downstream rotating body of the clutch."

In the present embodiment, the clutch actuator 19 is a hydraulic actuator. To be specific, the clutch actuator 19 includes a hydraulic chamber, a piston, and a solenoid valve. The piston is driven by hydraulic pressure (hereinafter may also be referred to as "clutch pressure") of the hydraulic chamber. The solenoid valve adjusts the hydraulic pressure of the hydraulic chamber. By changing the value of a current supplied to the solenoid valve, engaging pressure of the main clutch 18 changes, in other words, the fastening power by which the pair of contact members are engaged with each other changes. To be specific, in the present embodiment, the power transmission rate and the fastening power increase as the clutch pressure increases. Moreover, the pair of contact members of the clutch 18 are being biased by a spring in such a direction as to separate from each other. When the fastening power which is generated by the clutch actuator 19 to bring the pair of contact members into contact with each other is smaller than the biasing force of the spring, the contact members of the clutch 18 are disengaged from each other, i.e., the clutch 18 becomes the disengaged state.

The output shaft 22 is located parallel to the input shaft 21. Hereinafter, a direction parallel to the input shaft 21 and the output shaft 22 is referred to as an "axial direction." The transmission gear pairs 23 are lined up in the axial direction. Change gear ratios of the transmission gear pairs 23 are different from each other. The change gear ratio is a ratio of the rotational frequency of the input shaft 21 to the rotational frequency of the output shaft 22. The change gear ratio is also a ratio of the number of teeth of a gear at the output shaft 22 side to the number of teeth of a gear at the input shaft 21 side, and may also be referred to as a gear ratio. Each of the transmission gear pairs 23 includes one transmission gear coaxially located at the input shaft 21 and one transmission gear coaxially located at the output shaft 22.

One of the two transmission gears of each transmission gear pair 23 is a gear (hereinafter referred to as a "corotating gear") 23a that rotates integrally with the input shaft 21 or the output shaft 22 which is coaxial with this corotating gear 23a. For example, the corotating gear 23a is splined to the input shaft 21 or the output shaft 22. The other of the two transmission gears of each transmission gear pair 23 is a gear (hereinafter referred to as an "idling gear") 23b that rotates relative to the input shaft 21 or the output shaft 22 which is coaxial with this idling gear 23b.

In each transmission gear pair 23, the corotating gear 23a and the idling gear 23b mesh with each other at all times. In the present embodiment, the corotating gears 23a and the idling gears 23b are alternately lined up on the input shaft 21 in the axial direction. Similarly, the idling gears 23b and the corotating gears 23a are alternately lined up on the output shaft 22 in the axial direction. In FIG. 2, to avoid complexity, reference signs are shown for some of the corotating gears and idling gears, and reference signs for the other gears are not shown.

The gear transmission 20 is a dog transmission. The gear transmission 20 includes: dogs 24 corresponding to gear stages; and a shift mechanism 26. The dog is one example of an engaging structure.

The dogs 24 are movable by the shift mechanism 26 in the axial direction relative to the input shaft 21 and the output shaft 22. The dogs 24 are moved by the shift mechanism 26 in the axial direction and are selectively engaged with one of the transmission gears of the transmission gear pairs 23. Thus, the transmission gear pair 23 including the transmission gear which has been engaged with the dogs 24 becomes such a state as to be able to transmit the driving power from the input shaft 21 to the output shaft 22. To be specific, the driving power transmitted to the input shaft 21 is transmitted to the output shaft 22 through the transmission gear pair 23 including the transmission gear which has been engaged with the dogs 24. The rotational power of the output shaft 22 is transmitted through an output transmitting member 16 to the rear wheel 3 that is the driving wheel. The output transmitting member 16 is, for example, a chain, a belt, a drive shaft, or the like.

The shift mechanism 26 includes shift forks 27a, 27b, and 27c, a spindle 28, and a shift drum 29. The shift forks 27a,

27b, and 27c are supported by the spindle 28, located parallel to the input shaft 21 and the output shaft 22, so as to be slidable. As described below, in the present embodiment, each of some of the corotating gears 23a is integrated with the dogs 24. One end portion of the shift fork 27a is connected to the corotating gear 23a which is externally attached to the input shaft 21 and moves integrally with the dogs 24. Moreover, one end portion of the shift fork 27b is connected to the corotating gear 23a which is externally attached to the output shaft 22 and moves integrally with the dogs 24, and one end portion of the shift fork 27c is connected to the corotating gear 23a which is externally attached to the output shaft 22 and moves integrally with the dogs 24.

Moreover, the other end portions of the shift forks 27a, 27b, and 27c are fitted to guide grooves G of the shift drum 29. When the shift drum 29 rotates, the shift forks 27a, 27b, and 27c guided by the guide grooves G move the corresponding dogs 24 in the axial direction. When the dogs 24 enter below-described accommodating spaces S of the idling gear 23b, the dogs 24 are engaged with the idling gear 23b with backlash. Moreover, when the dogs 24 get out from the below-described accommodating spaces S of the idling gear 23b, the dogs 24 are disengaged from the idling gear 23b.

Figure 3:
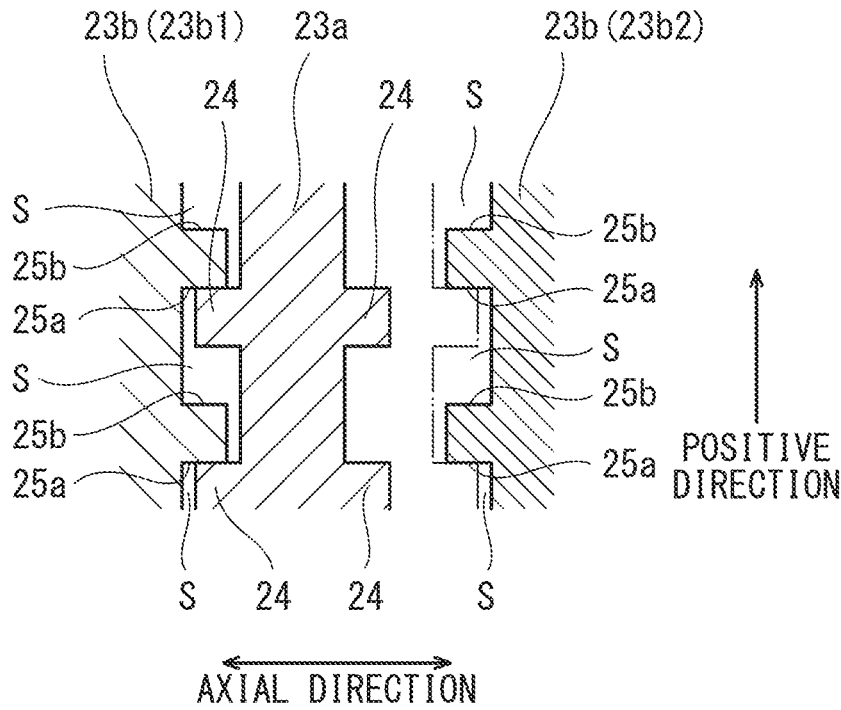
FIG. 3 is an enlarged schematic diagram showing one example of a state where a dog and a transmission gear are engaged with each other.

FIG. 3 is an enlarged view showing some transmission gears coaxially located at the input shaft 21 when viewed in a direction orthogonal to the axial direction. FIG. 3 shows one example of the engaged state between the transmission gear and the dogs 24 at a certain gear stage. In the present description, for convenience sake, a present gear stage is referred to as a first gear stage, and the gear which is included in the transmission gear pair 23 corresponding to the first gear stage and can be engaged with the dogs (hereinafter may be referred to as "first dogs") 24 corresponding to the first gear stage is referred to as a first gear (or a present gear or a pre-transmission gear) 23b1. Moreover, a next gear stage to which the dogs 24 have been shifted from the present gear stage based on a shift command is referred to as a second gear stage, and the gear which is included in the transmission gear pair 23 corresponding to the second gear stage and can be engaged with the dogs (hereinafter may be referred to as "second dogs") 24 corresponding to the second gear stage is referred to as a second gear (or a next gear or a post-transmission gear) 23b2.

As shown in FIG. 3, in the present embodiment, each of some of the corotating gears 23a is integrated with the dogs 24 and is movable together with the dogs 24 in the axial direction relative to the input shaft 21 or the output shaft 22. Specifically, the dogs 24 are located so as to project in the axial direction from axial end surfaces of the corotating gear 23a. The dogs 24 include projections which are located on the end surfaces of the corotating gear 23a and are lined up in a circumferential direction of the corotating gear 23a at predetermined intervals.

The idling gear 23b opposed to the dogs 24 and the corotating gear 23a in the axial direction includes the accommodating spaces S into which the dogs 24 can enter. The accommodating spaces S are open at a side where the dogs 24 are located in the axial direction such that the dogs 24 that are moving can enter. In the present embodiment, the accommodating spaces S are defined by projections which are located on an axial end surface of the idling gear 23b and are lined up in a circumferential direction of the idling gear 23b at predetermined intervals. To be specific, each of the accommodating spaces S is a space defined between the projections adjacent to each other in the circumferential direction of the idling gear 23b on the end surface of the idling gear 23b. The accommodating spaces S may be holes on the axial end surface of the idling gear 23b. To be specific, the accommodating space S may or may not be open in the radial direction of the idling gear 23b.

As shown in FIG. 3, the transmission gear including the accommodating spaces S includes first surfaces 25a and second surfaces 25b which are located in the circumferential direction of the transmission gear and define the accommodating spaces S. The first surface 25a is a surface with which the dog 24 having entered the accommodating space S contacts when the dog 24 transmits torque to at least the output shaft 22 in a predetermined positive direction. The second surface 25b is a surface with which the dog 24 having entered the accommodating space S contacts when the dog 24 transmits torque to at least the output shaft 22 in a negative direction opposite to the positive direction.

In FIG. 3, the axial direction and the positive direction are shown by arrows. In the present description, the positive direction denotes a direction in which the torque of the input shaft 21 and the torque of the output shaft 22 are generated to accelerate the output shaft 22 when the vehicle (in the present embodiment, the motorcycle 1) moves forward. To be specific, the first surface 25a is a surface with which the dog 24 having entered the accommodating space S contacts when the dog 24 accelerates at least the rotation of the output shaft 22. The second surface 25b is a surface with which the dog 24 having entered the accommodating space S contacts when the dog 24 decelerates at least the rotation of the output shaft 22. Especially, in the present embodiment, the first surface 25a is a surface with which the dog 24 having entered the accommodating space S contacts while the vehicle (in the present embodiment, the motorcycle 1) is accelerating forward. The second surface 25b is a surface with which the dog 24 having entered the accommodating space S contacts while the vehicle (in the present embodiment, the motorcycle 1) is decelerating. While the vehicle is moving at constant speed, the dog 24 may contact the first surface 25a or the second surface 25b.

As shown in FIG. 3, when the first dog 24 contacts the first surface 25a of the first gear 23b1, the driving power transmitted from the driving source to the input shaft 21 is transmitted from the first dogs 24 to the first gear 23b1 and is then transmitted to the output shaft 22 through the corotating gear 23a meshing with the first gear 23b1.

When the rotational frequency of each first dog 24 decreases relative to the rotational frequency of the first gear 23b1 from the state shown in FIG. 3, the first dogs 24 separate from the first surfaces 25a and contact the second surfaces 25b. When the first dogs 24 contact the second surfaces 25b of the first gear 23b1, the torque in the negative direction is transmitted from the first dogs 24 to the first gear 23b1 and is then transmitted to the output shaft 22 through the corotating gear 23a meshing with the first gear 23b1.

In FIG. 3, a state where the second dogs 24 contact the first surfaces 25a of the second gear 23b2 is shown by a two-dot chain line. By gear change processing of shifting from the first gear stage to the second gear stage, the first dogs 24 are disengaged from the first gear 23b1, and the second dogs 24 are engaged with the second gear 23b2.

FIG. 4 is a block diagram showing the controller 40 and its inputs and outputs. The controller 40 controls the engine 12, the drive motor 13, the clutch actuator 19, and the shift actuator 30. As shown in FIG. 4, the controller 40 receives detection signals from an accelerator operation amount sensor 32, the shift switch 17, a gear position sensor 31, an engine rotational frequency sensor 33, a motor rotational frequency sensor 34, an output shaft rotational frequency sensor 35, a current sensor 36, and the like. The controller 40 outputs control signals to throttle equipment 12c, an igniter 12d, a fuel supplier 12e, the drive motor 13, the clutch actuator 19, and the shift actuator 30.

The accelerator operation amount sensor 32 detects an accelerator operation amount (acceleration requested amount) of the rider.

The shift switch 17 sends a shift command to the controller 40 in accordance with a manual operation of the rider. The shift command is a command by which the gear stage of the gear transmission 20 is changed. For example, the shift command is a shift-up command or a shift-down command. The shift-up command is a command that changes the gear stage of the gear transmission 20 to a higher gear stage. More specifically, the shift-up command is a command that lowers the change gear ratio. The shift-down command is a command that changes the gear stage of the gear transmission 20 to a lower gear stage. More specifically, the shift-down command is a command that raises the change gear ratio.

The gear position sensor 31 detects a rotation angle of the shift drum 29. A selected one of the transmission gear pairs 23 of the gear transmission 20, i.e., a selected one of the gear stages can be detected by the rotation angle of the shift drum 29.

The engine rotational frequency sensor 33 detects a rotational frequency (hereinafter may be referred to as an "engine rotational frequency") of an output shaft of the engine 12. The motor rotational frequency sensor 34 detects a rotational frequency (hereinafter may be referred to as a "motor rotational frequency") of an output shaft of the drive motor 13.

The output shaft rotational frequency sensor 35 detects the rotational frequency of the output shaft 22. The output shaft rotational frequency sensor 35 may be located at the output shaft 22 and directly detect the rotational frequency of the output shaft 22. Or, the output shaft rotational frequency sensor 35 may indirectly detect the rotational frequency of the output shaft 22 by detecting another parameter. For example, the output shaft rotational frequency sensor 35 may be a wheel rotational frequency sensor that detects the rotational frequency of the rear wheel 3 that is the driving wheel (see FIG. 2).

The current sensor 36 detects the value of a current flowing through a solenoid of the solenoid valve that controls the clutch pressure of the clutch actuator 19.

The throttle equipment 12c adjusts an intake air amount of the engine 12. For example, the throttle equipment 12c is electronic control throttle equipment that opens and closes a throttle valve by a motor. The igniter 12d ignites a fuel-air mixture in the combustion chamber of the engine 12. The igniter 12d is, for example, an ignition plug. The fuel supplier 12e supplies fuel to the engine 12.

The shift actuator 30 generates the power that moves the dogs 24. Specifically, the shift actuator 30 is controlled by the controller 40 and rotates the shift drum 29 of the shift mechanism 26. To be specific, the shift actuator 30 is controlled by the controller 40, moves the dogs 24 engageable with the transmission gear pairs 23, and sets one transmission gear pair 23, which has been engaged with the dogs 24, among the transmission gear pairs 23 to a power transmitting state. The controller 40 controls the shift actuator 30 in accordance with the operation of the rider with respect to the shift switch 17. The shift actuator 30 is, for example, an electric motor.

The controller 40 includes one or more processors 41 in terms of hardware. The processor 41 includes a processing unit, a volatile memory, and a non-volatile memory. The processor 41 is one example of processing circuitry. In the processor 41, the processing unit performs calculation processing by using the volatile memory in accordance with a program stored in the non-volatile memory and outputs a control signal corresponding to the detection signals input to the controller 40. The controller 40 includes a mode switching module 41a, an engine control module 41b, a motor control module 41c, a clutch control module 41d, a shift control module 41e, a state judging module 41f, a position estimating module 41g, a target determining module 41h, and a timing determining module 41i in terms of software. In FIG. 4, one or more processors 41 are shown by one block, and functional blocks 41a, 41b, 41c, 41d, 41e, 41f, 41g, 41h, and 41i are shown in the block of the processor 41. Moreover, the controller 40 includes a memory 42. The memory 42 includes the volatile memory and the non-volatile memory.

The mode switching module 41a selects one of traveling modes including an EGV mode, an EV mode, and a HEV mode.

The EGV mode is a mode in which: the drive motor 13 is not driven; the engine 12 is driven; and the rear wheel 3 that is the driving wheel is driven only by the rotational power of the engine 12. In the EGV mode, the main clutch 18 is set to the engaged state by the clutch actuator 19 such that the rotational power of the engine 12 is transmitted through the gear transmission 20 to the rear wheel 3 that is the driving wheel.

The EV mode is a mode in which: the engine 12 is stopped; and the rear wheel 3 that is the driving wheel is driven by the power generated by the drive motor 13. In the EV mode, the main clutch 18 is set to the disengaged state by the clutch actuator 19 such that the engine 12 does not become resistance during the driving of the drive motor 13.

The HEV mode is a mode in which the rear wheel 3 that is the driving wheel is driven by the power generated by the drive motor 13 and the engine 12. In the HEV mode, the main clutch 18 is set to the engaged state by the clutch actuator 19 such that the rotational power of the engine 12 is transmitted to the rear wheel 3 through the gear transmission 20.

The EGV mode may be omitted, and the HEV mode may include a state where the rear wheel 3 that is the driving wheel is driven only by the rotational power of the engine 12. To be specific, the HEV mode may be one traveling mode in which the rear wheel 3 is driven by at least the power generated by the engine 12. Moreover, the HEV mode also includes an electric power generation traveling state in which output torque of the engine 12 makes the motorcycle 1 travel while making the drive motor 13 generate electric power. To be specific, in the electric power generation traveling state, the drive motor 13 may generate negative torque, and the engine 12 may be required to generate torque necessary for traveling, and in addition, torque that cancels the negative torque of the drive motor 13.

The engine control module 41b controls the throttle equipment 12c, the igniter (ignition plug) 12d, and the fuel supplier 12e to adjust the output of the engine 12. For example, the engine control module 41b performs torque control such that the output torque of the engine 12 becomes a value corresponding to the accelerator operation amount of the rider. The motor control module 41c controls the drive motor 13 to adjust the output of the drive motor 13. For example, the motor control module 41c performs torque control such that the output torque of the drive motor 13 becomes a value corresponding to the accelerator operation amount of the rider. The engine control module 41b and the motor control module 41c perform control corresponding to the traveling mode selected by the mode switching module 41a.

The clutch control module 41d outputs to the clutch actuator 19 a clutch pressure command value (a command value of the current applied to the solenoid valve) by which the power transmission rate of the clutch 18 is changed.

In the present embodiment, the clutch actuator 19 is a hydraulic actuator. To be specific, the clutch actuator 19 changes the clutch pressure to change the power transmission rate of the power transmitted from the engine 12 to the input shaft 21. There is a predetermined correlation between the clutch pressure and the power transmission rate of the clutch 18. To be specific, the clutch pressure is a parameter indicating the power transmission rate of the clutch 18. When the clutch pressure is preset open corresponding pressure, the power transmission rate of the clutch 18 is 0%, and the clutch 18 is in the disengaged state. Then, as the clutch pressure increases from the open corresponding pressure, the power transmission rate also increases. When the clutch pressure is preset fastening corresponding pressure or not less than the fastening corresponding pressure, the power transmission rate of the clutch 18 is 100%, and the clutch 18 is in the engaged state.

Moreover, the clutch pressure has a correlation with the value of the current flowing through the solenoid that controls the clutch pressure. Therefore, in the present embodiment, from the value of the current flowing through the solenoid and detected by the current sensor 36, the clutch control module 41d estimates the clutch pressure corresponding to the value of this current. Then, from the estimated clutch pressure, the clutch control module 41d estimates the power transmission rate corresponding to the clutch pressure. The current value detected by the current sensor 36 is also a parameter indicating the power transmission rate of the clutch 18. The clutch control module 41d determines the clutch pressure command value based on the current value acquired from the current sensor 36.

Instead of the current sensor 36, a hydraulic pressure sensor that detects the clutch pressure may be mounted on a vehicle body of the motorcycle 1. In this case, the clutch control module 41d may determine the clutch pressure command value based on a value acquired from the hydraulic pressure sensor.

For example, when the EV mode is selected by the mode switching module 41a, the clutch control module 41d sets the main clutch 18 to the disengaged state. Moreover, when the EGV mode or the HEV mode is selected by the mode switching module 41a, the clutch control module 41d sets the main clutch 18 to the engaged state.

The shift control module 41e, the state judging module 41f, the position estimating module 41g, the target determining module 41h, and the timing determining module 41i are related to the gear change processing executed when the shift command is acquired, i.e., when the shift command is received from the shift switch 17. That the controller 40 acquires information such as the shift command includes not only that the controller 40 receives information from outside but also that the controller 40 generates information.

The shift control module 41e controls the shift actuator 30 in accordance with the acquired shift command. The state judging module 41f judges whether or not there is a shift command by which the first gear stage is shifted to the second gear stage. Moreover, the state judging module 41f judges whether or not a present control mode for the clutch 18 is a clutch gear change mode. The clutch gear change mode will be described later. The position estimating module 41g estimates the angular position of the dog 24 relative to the accommodating space S. For example, the position estimating module 41g may estimate the angular position of the dog 24 based on the torque command value with respect to the prime mover and the inertia of the prime mover. The target determining module 41h determines a target engine rotational frequency, a target motor rotational frequency, a target drum angle, and the like when the dogs 24 are shifted. The timing determining module 41i determines a timing at which below-described synchronous control is started and a timing at which control of moving the dogs 24 is started.

Gear Change Processing

Figure 5:
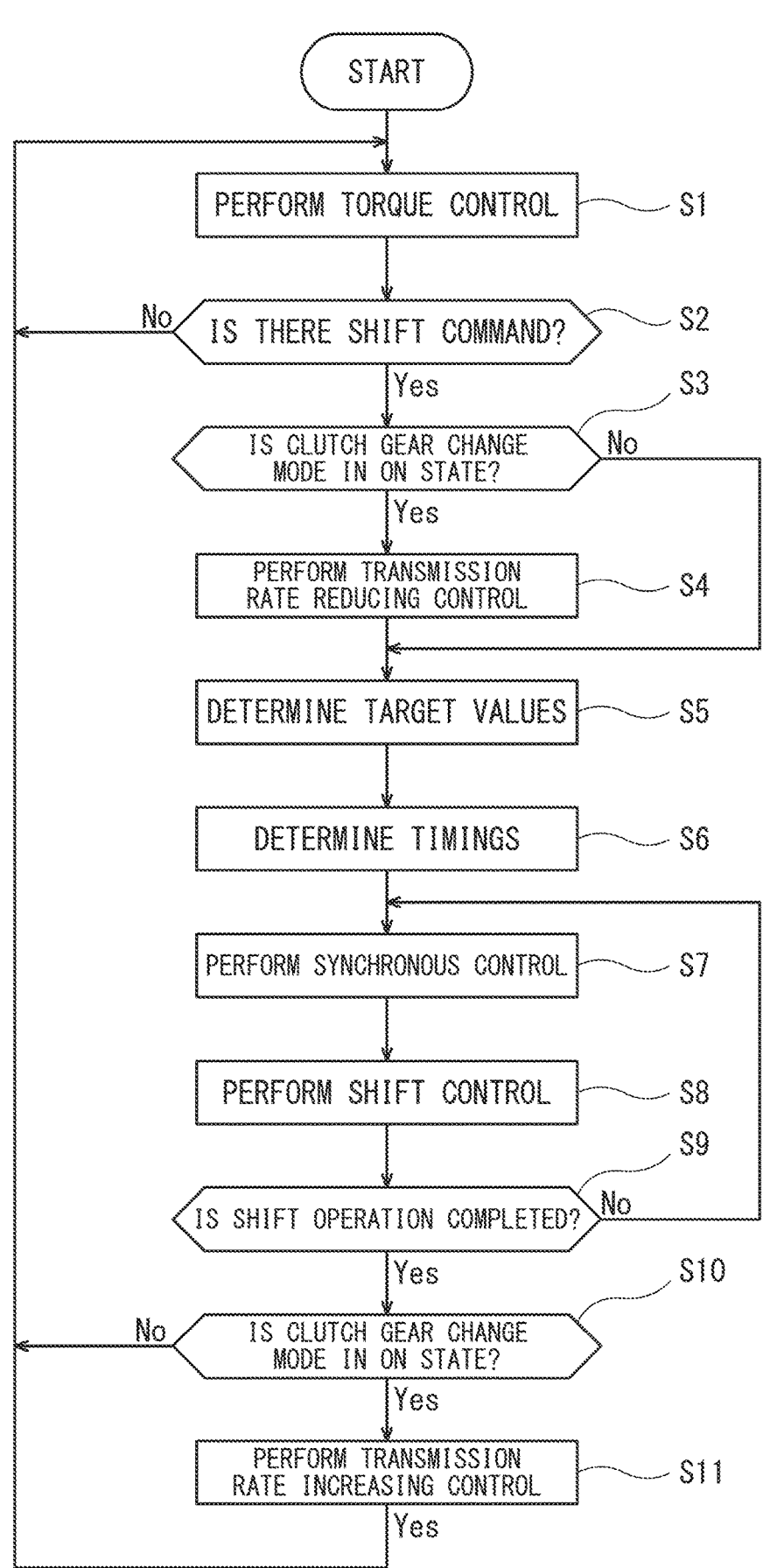
FIG. 5 is a flowchart showing the flow of gear change processing in a HEV mode.
Figure 6:
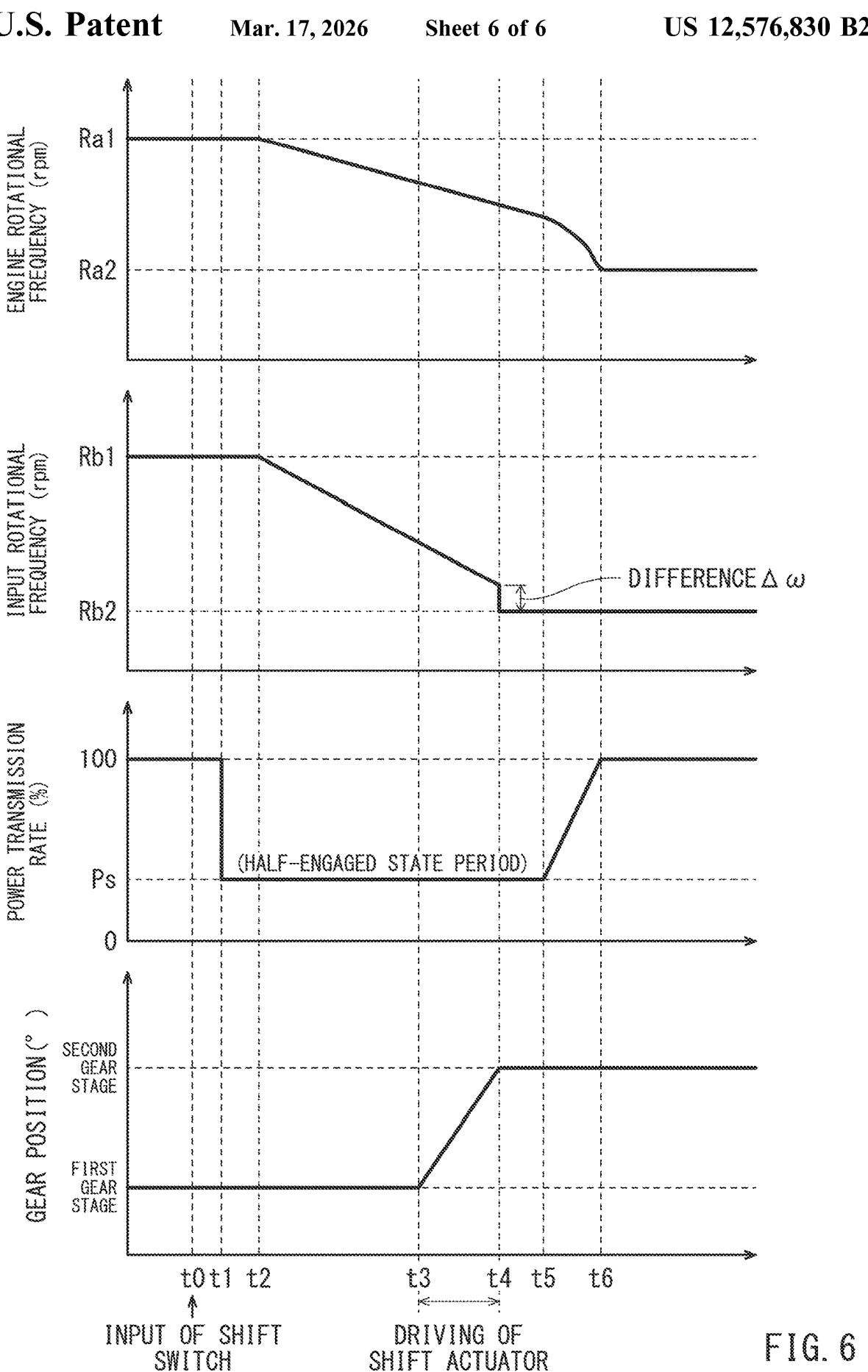
FIG. 6 is a graph showing one example of a change in engine rotational frequency, a change in input rotational frequency, a change in power transmission rate of a clutch, and a change in gear position when the gear change processing is executed in an on state of a clutch gear change mode in the HEV mode.

As one example of the gear change processing, the gear change processing of shifting from the first gear stage to the second gear stage in the HEV mode will be described with reference to FIGS. 5 and 6. FIG. 5 is a flowchart showing the flow of the gear change processing in the HEV mode. FIG. 6 is a graph showing one example of a change in the engine rotational frequency, a change in the rotational frequency of the input shaft 21, a change in the power transmission rate of the clutch 18, and a change in the gear position when executing the gear change processing in the on state of the clutch gear change mode in the HEV mode. The rotational frequency of the input shaft 21 may be referred to as an input rotational frequency. In FIG. 6, a horizontal axis represents a time. As one example of the gear change processing, FIG. 6 shows changes in values in the gear change processing when the rider has performed the operation of changing the gear stage from the first gear stage to the second gear stage.

At least one of the engine control module 41b and the motor control module 41c is basically performing the above torque control during the traveling of the motorcycle 1 (Step S1).

For example, the processor 41 determines an engine torque command value and a motor torque command value in accordance with the accelerator operation amount of the rider and the like. The engine control module 41b controls the throttle equipment 12c and the like based on the engine torque command value, and the motor control module 41c controls the drive motor 13 based on the motor torque command value.

During the torque control, the state judging module 41f judges whether or not there is the shift command (i.e., the shift-up command or the shift-down command) by which the first gear stage is shifted to the second gear stage (Step S2). When it is judged that there is no shift command (No in Step S2), at least the torque control by the engine control module 41b continues.

Judgement in Clutch Gear Change Mode

When it is judged that there is the shift command (Yes in Step S2), i.e., when the shift command generated by the operation of the rider with respect to the shift switch 17 is acquired (see t0 in FIG. 6), the state judging module 41f judges whether or not the clutch gear change mode is in the on state. The clutch gear change mode is a mode in which the gear shift shock that is the shock generated at the time of the shift control is reduced by reducing the inertial moment of the input shaft 21 and the inertial moment of the rotating body connected to the input shaft 21 at the time of the shift control. Specifically, as described below, transmission rate reducing control and transmission rate increasing control are executed in the clutch gear change mode.

Whether to set the clutch gear change mode to the on state may be manually selected by the rider through a predetermined input interface. For example, when reducing a time required for a series of control related to the gear change is prioritized over reducing the gear shift shock, the off state of the clutch gear change mode can be selected.

Or, whether to set the clutch gear change mode to the on state may be automatically selected by executing a predetermined program stored in the memory 42. For example, the state judging module 41f judges based on the detected values of various sensors mounted on the vehicle body whether or not there is a predetermined state in which it is desirable to reduce the gear shift shock. When it is judged that there is the predetermined state, the clutch gear change mode may be selected.

When the state judging module 41f judges that the clutch gear change mode is in the off state (No in Step S3), the process proceeds to Step S5. When the state judging module 41f judges that the clutch gear change mode is in the on state (Yes in Step S3), the process proceeds to the transmission rate reducing control (Step S4).

Transmission Rate Reducing Control

In the transmission rate reducing control, the clutch control module 41d controls the clutch actuator 19 to reduce the power transmission rate. Specifically, the clutch control module 41d controls the clutch actuator 19 such that the power transmission rate is reduced from 100% to a set value Ps (see t1 in FIG. 6).

A reduced amount of the power transmission rate in the transmission rate reducing control may change depending on the situation. The set value Ps may change depending on the situation. In the present embodiment, the set value Ps changes in accordance with the accelerator operation amount of the rider. The memory 42 stores a correspondence relation between the set value Ps and the accelerator operation amount or between the set value Ps and required torque calculated from the accelerator operation amount. For example, the clutch control module 41d acquires the accelerator operation amount from the accelerator operation amount sensor 32 and controls the clutch actuator 19 such that the power transmission rate is reduced from 100% to the set value Ps corresponding to the accelerator operation amount. To be specific, the clutch control module 41d controls the clutch actuator 19 such that the detected value of the current sensor 36 becomes a current value corresponding to the set value Ps.

A state where the rider is performing an accelerating operation may be a state where the rider can allow some shock generated at the vehicle body. Therefore, when the accelerator operation amount is relatively large, the reduced amount of the power transmission rate is made small. For example, when the accelerator operation amount is not more than a set value, the clutch control module 41d sets the set value Ps to 0%. To be specific, the clutch 18 is set to the disengaged state. Moreover, when the accelerator operation amount is more than the set value, the clutch control module 41d sets the set value Ps to, for example, a value that is more than 0% and less than 100%. To be specific, the clutch 18 is set to the half-engaged state.

When the clutch control module 41d judges that the power transmission rate has reached the set value Ps, specifically, when the clutch control module 41d judges that the detected value of the current sensor 36 has become the current value corresponding to the set value Ps, the transmission rate reducing control is terminated, and the process proceeds to Step S5. In a period from when the transmission rate reducing control is started until when the below-described transmission rate increasing control is started, the power transmission rate is maintained at the set value. The period in which the power transmission rate is maintained at the set value may be part of the period from when the transmission rate reducing control is started until when the below-described transmission rate increasing control is started. Moreover, in the period from when the transmission rate reducing control is started until when the below-described transmission rate increasing control is started, the power transmission rate may change in accordance with the detected values of various sensors.

Determination of Target Values

After it is judged in Step S3 that the clutch gear change mode is in the off state, or after the transmission rate reducing control is executed in Step S4, the target determining module 41*h* determines various target values (Step S5).

Specifically, the target determining module 41*h* determines the target engine rotational frequency, the target motor rotational frequency, and the target drum angle. Each of the target engine rotational frequency and the target motor rotational frequency is a rotational frequency corresponding to the second gear stage. More specifically, the target engine rotational frequency is the engine rotational frequency for synchronous control in which one of the rotational frequency of the dog 24 in the second gear stage and the rotational frequency of the transmission gear in the second gear stage is made to approach the other. Or, the target engine rotational frequency is the engine rotational frequency for synchronous control in which the rotational frequency of the input shaft-side rotating body of the clutch 18 and the rotational frequency of the engine-side rotating body of the clutch 18 are made to approach each other. Moreover, the target motor rotational frequency is the motor rotational frequency for the synchronous control in which one of the rotational frequency of the dog 24 in the second gear stage and the rotational frequency of the transmission gear in the second gear stage is made to approach the other. Or, the target motor rotational frequency is the motor rotational frequency for the synchronous control in which the rotational frequency of the input shaft-side rotating body of the clutch 18 and the rotational frequency of the engine-side rotating body of the clutch 18 are made to approach each other.

Herein, the "synchronous control in which one of the rotational frequency of the dog 24 in the second gear stage and the rotational frequency of the transmission gear in the second gear stage is made to approach the other" denotes control in which the rotational frequency of an input side out of the dog 24 and the second gear 23*b*2 is made to approach the rotational frequency of an output side out of the dog 24 and the second gear 23*b*2. For example, when the dog 24 that rotates integrally with the input shaft 21 is engaged with the second gear 23*b*2 that is externally attached to the input shaft 21, the synchronous control denotes control in which the rotational frequency of the dog 24 is made to approach the rotational frequency of the second gear 23*b*2. Moreover, for example, when the dog 24 that rotates integrally with the output shaft 22 is engaged with the second gear 23*b*2 that is externally attached to the output shaft 22, the synchronous control denotes control in which the rotational frequency of the second gear 23*b*2 is made to approach the rotational frequency of the dog 24. By performing the synchronous control before putting the dog 24 into the accommodating space S of the second gear 23*b*2, the dog 24 is smoothly engaged with the second gear 23*b*2.

When the clutch 18 is in the disengaged state, the change in the rotational frequency of the engine 12 does not contribute to the change in the rotational frequency of the input shaft 21. To be specific, when the clutch 18 is set to the disengaged state by the transmission rate reducing control, the synchronous control is performed by the drive motor 13. Even when the synchronous control is performed by the drive motor 13 with the clutch 18 in the disengaged state, the rotational frequency of the engine 12 is also controlled to become the rotational frequency corresponding to the second gear stage. In other words, even when the clutch 18 is in the disengaged state, the synchronous control in which one of the rotational frequency of the upstream rotating body of the clutch 18 and the rotational frequency of the downstream rotating body of the clutch 18 is made to approach the other is executed. By such control, the difference between the rotational frequency of the upstream rotating body of the clutch 18 and the rotational frequency of the downstream rotating body of the clutch 18 can be reduced, and as a result, the shock generated when executing the below-described power transmission rate increasing control can be reduced.

In the following description, for convenience sake, the synchronous control in which one of the rotational frequency of the dog 24 in the second gear stage and the rotational frequency of the transmission gear in the second gear stage is made to approach the other is referred to as "gear synchronous control," and the synchronous control in which one of the rotational frequency of the upstream rotating body of the clutch 18 and the rotational frequency of the downstream rotating body of the clutch 18 is made to approach the other is referred to as "clutch synchronous control." Moreover, the gear synchronous control and the clutch synchronous control may be indiscriminately referred to as the synchronous control.

In the present embodiment, in Step S5, first, the shift control module 41*e* judges the first gear stage that is the present gear stage of the gear transmission 20, from a detected angle signal of the gear position sensor 31. Moreover, the shift control module 41*e* determines the second gear stage that is the next gear stage, in accordance with whether the shift command is the shift-up command or the shift-down command. The target determining module 41*h* calculates the target engine rotational frequency and the target motor rotational frequency from the change gear ratio of the second gear stage and the present rotational frequency of the output shaft 22 such that one of the rotational frequency of the dog 24 in the second gear stage and the rotational frequency of the second gear 23*b*2 in the second gear stage is made to approach the other. In the HEV mode, the rotational frequency of the input shaft 21 corresponding to the target engine rotational frequency and the rotational frequency of the input shaft 21 corresponding to the target motor rotational frequency are the same in value as each other.

Determination of Timing

After Step S5, the timing determining module 41*i* determines the timing at which the synchronous control is started and the timing at which control that moves the dog 24 is started (Step S6).

In the present embodiment, the synchronous control for the engine 12 and the synchronous control for the drive motor 13 are started from the same time point t2. However, the synchronous control for the engine 12 and the synchronous control for the drive motor 13 may be started from different timings. For example, the synchronous control for the engine 12 may be started prior to the synchronous control for the drive motor 13. A start timing of the synchronous control may be determined in accordance with the angular position of the dog 24 which has been estimated by the position estimating module 41*g*.

Moreover, the timing determining module 41*i* determines the timing at which the shift control is started. The shift control is control in which: the dogs 24 of the first gear stage are separated from the first gear 23*b*1; and the dogs 24 of the second gear stage are moved toward the second gear 23*b*2.

The start timing and completion timing of the shift control are determined such that, for example, the gear shift shock is reduced. For example, the timing of the shift control is determined such that the second dog 24 and the second gear 23*b*2 are engaged with each other at a timing at which a difference $\Delta_\omega$ between the rotational frequency of the second dog 24 and the rotational frequency of the second gear 23*b*2 becomes a predetermined value or less. For example, the timing at which the shift control is started may be determined based on the estimated angular position of the dog 24. Or, the timing at which the shift control of the dog 24 is started may be determined based on the determined start timing of the synchronous control. To be specific, after the start timing of the synchronous control is determined first, the start timing of the shift control of the dog 24 may be determined.

After the start timing of the synchronous control and the start timing of the shift control of the dog 24 are determined in Step S6, the synchronous control (Step S7; see t2 in FIG. 6) and the shift control (Step S8; see t3 in FIG. 6) are performed in accordance with the determined timings.

Specifically, the engine control module 41*b* starts the synchronous control at the timing determined in Step S6. When the synchronous control is started, the engine control module 41*b* performs feedback control of the engine 12, i.e., feedback control of the throttle equipment 12*c*, the igniter 12*d*, the fuel supplier 12*e*, and the like such that the rotational frequency of the engine 12 approaches from a present rotational frequency Ra1 to a target engine rotational frequency Ra2 determined in Step S5. Moreover, the motor control module 41*c* starts the synchronous control at the timing determined in Step S6. When the synchronous control is started, the motor control module 41*c* performs feedback control of the drive motor 13 such that the rotational frequency of the drive motor 13 approaches from a present rotational frequency Rb1 to a target motor rotational frequency Rb2 determined in Step S5.

In FIG. 6, the input rotational frequency is reduced by the gear synchronous control in a period from the time point t2 to the time point t4. As above, when the shift-up command of changing the gear stage from the first gear stage to the second gear stage is acquired, the rotational frequency reducing control of reducing the rotational frequency of the input shaft 21 is executed as the gear synchronous control. However, when the shift-down command is acquired, the rotational frequency increasing control of increasing the rotational frequency of the input shaft 21 is executed as the gear synchronous control.

Moreover, the shift control module 41*e* controls the shift actuator 30 such that the shift control is started at the timing determined in Step S6. To be specific, the shift control module 41*e* controls the shift actuator 30 such that the first gear 23*b*1 corresponding to the first gear stage and the first dog 24 are disengaged from each other, and the second gear 23*b*2 corresponding to the second gear stage and the second dog 24 are engaged with each other.

The shift control module 41*e* judges whether or not the shift operation corresponding to the shift command has been completed (Step S9). Specifically, the shift control module 41*e* judges whether or not the drum angle detected by the gear position sensor 31 is the target drum angle determined in Step S5.

While the shift control module 41*e* does not judge that the shift operation corresponding to the shift command has been completed (No in Step S9), the synchronous control and the shift control continue. For example, even after the shift control is executed, i.e., even after the time point t4 in FIG. 6, the clutch synchronous control for the engine 12 continues, i.e., the synchronous control of reducing the difference between the rotational frequency of the upstream rotating body of the clutch 18 and the rotational frequency of the downstream rotating body of the clutch 18 continues.

When the shift control module 41*e* judges that the shift operation corresponding to the shift command has been completed (Yes in Step S9), the state judging module 41*f* judges whether or not the clutch gear change mode is in the on state (Step S10). When the state judging module 41*f* judges that the clutch gear change mode is in the off state (No in Step S10), the process returns to Step S1. When the state judging module 41*f* judges that the clutch gear change mode is in the on state (Yes in Step S10), the process proceeds to the transmission rate increasing control (Step S10; see t5-t6 in FIG. 6).

Transmission Rate Increasing Control

In the transmission rate increasing control, the clutch control module 41*d* controls the clutch actuator 19 such that the power transmission rate which has been reduced in the transmission rate reducing control in Step S4 returns to the original power transmission rate. Specifically, the clutch control module 41*d* controls the clutch actuator 19 such that the power transmission rate increases from the set value Ps to 100% (see t5-t6 in FIG. 6). In the present embodiment, in the transmission rate increasing control, tailing control of controlling the clutch actuator such that the power transmission rate gradually approaches 100% with time is performed.

After the transmission rate increasing control in Step S11 is completed, the process returns to the torque control in Step S1. Whether or not the transmission rate increasing control has been completed may be judged based on whether or not the detected value of the current sensor 36 has reached a value corresponding to 100% of the power transmission rate.

In the above gear change processing, whether or not the clutch gear change mode is in the on state is judged in Steps S2 and S10. However, in the gear change processing in the HEV mode, the control when the clutch gear change mode is in the on state may be performed at all times. To be specific, when the shift command is acquired, the transmission rate reducing control in Step S4 and the transmission rate increasing control in Step S11 may be executed at all times. In this case, Steps S2 and S10 may be omitted.

Operational Advantages

As described above, according to the present embodiment, the power transmission rate of the clutch 18 is reduced before executing the shift control. This can reduce the shock which may be generated at the vehicle body when the transmission gear pair 23 and the dogs 24 which correspond to the second gear stage are engaged with each other in the shift control.

The effect of reducing the gear shift shock will be described in more detail. By the shift control in Step S8, the second dogs 24 corresponding to the second gear stage enter the accommodating spaces S of the second gear 23*b*2. Thus, at the time point t4 in FIG. 6, the second dogs 24 and the second gear 23*b*2 are engaged with each other. At this time, the magnitude of the gear shift shock generated by the collision between the second dog 24 and the second gear 23*b*2 (i.e., the surface defining the accommodating space S of the second gear 23*b*2) depends on a value $I \times \Delta_\omega$ obtained by multiplying an inertial moment I of a driving part that rotates together with the input shaft 21 by the difference $\Delta_\omega$ between the rotational frequency of the second dog 24 and the rotational frequency of the second gear 23b2. The larger the value $I \times \Delta_\omega$ is, the larger the gear shift shock is.

In the present embodiment, the difference $\Delta_\omega$ is reduced by the gear synchronous control in which the rotational frequency of the second dog 24 and the rotational frequency of the second gear 23b are made to approach each other in Step S7.

Moreover, when the clutch gear change mode is in the on state, the apparent inertia I of the driving part that rotates together with the input shaft 21 is reduced by executing the transmission rate reducing control in Step S4. In other words, the degree of difficulty in rotating the input shaft 21 is reduced by the transmission rate reducing control. Therefore, the value $I \times \Delta_\omega$ when the transmission rate reducing control is performed is smaller than the value $I \times \Delta_\omega$ when the transmission rate reducing control is not performed, when the difference $\Delta_\omega$ between the rotational frequency of the second dog 24 and the rotational frequency of the second gear 23b2 is assumed to be the same therebetween.

Therefore, in the present embodiment, the gear shift shock generated when the second dog 24 and the second gear 23b2 are engaged with each other can be reduced by reducing both of the inertia I and the difference $\Delta_\omega$.

Moreover, in the present embodiment, after the transmission rate reducing control is executed, the engine 12 is controlled such that the difference between the rotational frequencies of the pair of contact members of the clutch 18 is reduced, i.e., the difference between the rotational frequency of the input shaft-side rotating body of the clutch 18 and the rotational frequency of the engine-side rotating body of the clutch 18 is reduced. Therefore, the shock which may be generated at the vehicle body when executing the transmission rate increasing control can be reduced.

Moreover, in the present embodiment, the drive motor 13 that is the second driving source is included separately from the engine 12 that is the first driving source. Therefore, even when the clutch 18 is set to the disengaged state by the transmission rate reducing control, the power can be transmitted to the driving wheel by the second driving source.

Moreover, in the present embodiment, after the transmission rate reducing control is executed, the drive motor 13 is controlled such that the gear synchronous control is executed. Therefore, even when the clutch 18 is in the disengaged state, the difference $\Delta_\omega$ can be reduced, and the gear shift shock can be reduced.

Moreover, in the present embodiment, since a half-engaged state period exists in the period from when the transmission rate reducing control is started until when the transmission rate increasing control is started, the power transmitting state between the pair of contact members of the clutch 18 is maintained. Thus, the difference between the rotational frequencies of the pair of contact members can be reduced, and the shock which may be generated at the vehicle body due to the transmission rate increasing control is easily reduced. Moreover, the shock which may be generated at the vehicle body since the transmission gear and the dog 24 separate from each other and contact each other in a rotational direction, i.e., for example, since the dog 24 plays, can be reduced by maintaining the power transmitting state.

Moreover, in the present embodiment, the reduced amount of the power transmission rate in the transmission rate reducing control changes depending on the situation. When the acceleration of the vehicle is large, the transmission gear and the dog 24 tend to separate from each other and contact each other, i.e., for example, the dog 24 tends to play. Moreover, a state where the acceleration of the vehicle is large may be a state where the rider can allow some shock generated at the vehicle body. In the present embodiment, the magnitude of the gear shift shock can be adjusted in accordance with the degree of occurrence of the separation and contact between the transmission gear and the dog 24, the degree of allowance of the rider with respect to the shock, and the like.

Moreover, in the present embodiment, in the transmission rate increasing control, the clutch actuator 19 is controlled such that the power transmission rate gradually approaches 100% with time. Therefore, the shock which may be generated at the vehicle body due to the transmission rate increasing control is easily reduced.

Other Embodiments

The present disclosure is not limited to the above embodiment, and modifications, additions, and eliminations may be made with respect to the configuration of the embodiment.

For example, in the above embodiment, the dogs 24 are integrated with the corotating gear 23a. However, the dogs 24 may be separated from the corotating gear 23a. For example, instead of locating the corotating gear 23a that is slidable relative to the input shaft 21 or the output shaft 22, a dog ring including the dogs 24 may be located so as to be slidable relative to the input shaft 21 or the output shaft 22. Moreover, the dogs do not have to be located around both of the input shaft 21 and the output shaft 22, and the dogs of all the gear stages may be located at a rotating body (a gear, a dog ring, etc.) supported by only one of the input shaft 21 and the output shaft 22.

FIG. 3 shows the transmission gear including both of the dogs (first dogs) 24 for the first gear stage that is the present gear stage and the dogs (second dogs) 24 for the second gear stage that is the next gear stage. However, the gear transmission does not have to include such transmission gear. To be specific, the dogs 24 for the first gear stage and the dogs 24 for the second gear stage that is the next gear stage may be located at different transmission gears or at different dog rings.

Moreover, in the above embodiment, the dogs are moved by the shift actuator. However, the engaging structures moved by the shift actuator are not limited to these. For example, the dogs may be fixed to the transmission gear, and a member including engagement holes (or accommodating spaces) with which the dogs are engaged may be moved by the shift actuator. To be specific, to set the transmission gear pair to the power transmitting state, the engaging structures that are engaged with the transmission gear pair may be the dogs or may be structures (for example, the engagement holes) with which the dogs are engaged. Moreover, the shape of the engaging structure is not especially limited, i.e., the shape of the dog and the shape of the engagement hole with which the dog is engaged are not especially limited.

The shift command may be transmitted from a device that is not the shift switch. Moreover, the controller may automatically generate the shift command. For example, the controller may store a gear change map that defines a relation among the vehicle speed, the engine rotational frequency, a throttle opening degree, and a gear change timing, and may automatically generate the shift command based on the gear change map.

Moreover, the above embodiment has described an example in which the first driving source is the internal combustion engine, and the second driving source is the electric motor. However, the types of the prime movers that transmit the driving power to the input shaft are not limited to these. Examples of the driving source include an internal combustion engine, an external combustion engine, an electric motor, and fluid machinery. The type of the engine is not especially limited. For example, the engine may be a reciprocating engine or a rotary engine. For example, the engine may be a gasoline engine or a diesel engine. For example, the engine may be a two-stroke engine or a four-stroke engine. The first driving source and the second driving source may be prime movers of the same type.

Moreover, in the synchronous control, the start timing of the first driving source and the start timing of the second driving source may be different from each other. Moreover, in the above embodiment, the vehicle including the controller 40 is the hybrid vehicle including the first driving source and the second driving source. However, the vehicle does not have to be the hybrid vehicle. For example, as the driving source, the vehicle may include only one of the engine and the electric motor.

For example, even when the vehicle is an engine vehicle including only an internal combustion engine as the traveling driving source, the control of the controller is applicable. In the engine vehicle, it is desirable that the set value Ps in the transmission rate reducing control be a value that is more than 0% and less than 100%. In other words, in the engine vehicle, it is desirable that in the transmission rate reducing control, the clutch 18 be set to not the disengaged state but the half-engaged state. This is because when the clutch 18 is set to the disengaged state in the engine vehicle, the rotational frequency of the input shaft of the transmission cannot be changed, i.e., the gear synchronous control cannot be performed. In the engine vehicle, when the clutch 18 is set to the half-engaged state in the transmission rate reducing control, the power of the internal combustion engine can be partially transmitted to the input shaft of the transmission, and therefore, the gear synchronous control can be performed. Thus, in the engine vehicle, the difference between the rotational frequency of the transmission gear corresponding to the second gear stage and the rotational frequency of the engaging structure corresponding to the second gear stage can be reduced before the transmission gear and the engaging structure are engaged with each other, and as a result, the shock which may be generated when the transmission gear corresponding to the second gear stage and the engaging structure corresponding to the second gear stage are engaged with each other can be reduced. The same is true in the control performed when the EGV mode is selected as the traveling mode in the configuration described in the above embodiment.

The vehicle is not limited to the motorcycle. For example, the vehicle may be an automatic three-wheeled vehicle or an automatic four-wheeled vehicle. The above embodiment has described the controller 40 for the power system of the motorcycle 1. However, the controller is applicable to power systems of different types of vehicles, such as the automatic three-wheeled vehicle and the automatic four-wheeled vehicle.

In the above embodiment, the hydraulic actuator is described as the clutch actuator. However, the clutch actuator may be an electric motor. In this case, as a sensor that detects a parameter corresponding to the power transmission rate of the clutch, a displacement sensor that detects the displacement of one of a driving member and a driven member relative to the other may be used instead of using the hydraulic pressure sensor or the current sensor 36.

In the above embodiment, the set value Ps corresponding to the reduced amount of the power transmission rate in the transmission rate reducing control is determined in accordance with the accelerator operation amount. However, the method of determining the reduced amount of the power transmission rate in the transmission rate reducing control is not limited to this. For example, while the transmission rate reducing control is executed, the processing circuitry may control the clutch actuator based on the gear ratio of the gear transmission, the rotational frequency of the driving source, the required torque required to the driving source, the target rotational frequency of the driving source, or the vehicle speed of the vehicle. The target rotational frequency of the driving source is the target rotational frequency used to perform the gear synchronous control in which one of the rotational frequency of the second dog in the second gear stage and the rotational frequency of the second gear in the second gear stage is made to approach the other.

For example, the vehicle may include a torque related value sensor that detects a torque related value related to the required torque required to the driving source, and the processor of the controller may determine the reduced amount of the power transmission rate in the transmission rate reducing control based on the torque related value detected by the torque related value sensor. In this case, the torque related value may be the gear ratio of the gear transmission, the rotational frequency of the driving source, the rotational frequency of the input shaft of the gear transmission, the rotational frequency of the output shaft of the gear transmission, the accelerator operation amount, the vehicle speed of the vehicle, or the like. The torque related value sensor may be a gear position sensor, an engine rotational frequency sensor, an input shaft rotational frequency sensor, an output shaft rotational frequency sensor, an accelerator operation amount sensor, a vehicle speed sensor, or the like. Since the reduced amount of the power transmission rate is determined based on the torque related value related to the required torque required to the driving source, the gear shift shock is easily adjusted to a level allowed by the rider or the like.

For example, when the torque related value detected by the torque related value sensor shows relatively large required torque, it is thought that the rider can allow some shock generated at the vehicle body. Moreover, for example, when the torque related value detected by the torque related value sensor shows relatively small required torque, there is a high possibility that the rider cannot allow the shock generated at the vehicle body as compared to when the required torque is large. To be specific, whether or not the rider can allow some shock generated at the vehicle body is judged based on the torque related value. When it is judged that the rider can allow the shock, the gear shift shock may become large to some extent, and therefore, the reduced amount of the power transmission rate may be made small. For example, when the processor judges that the torque related value detected by the torque related value sensor shows the required torque larger than a predetermined value, the processor may set the reduced amount of the power transmission rate in the transmission rate reducing control to a value smaller than the reduced amount when the processor judges that the torque related value shows the required torque smaller than the predetermined value.

The set value Ps does not have to be a value that changes depending on the situation, and may be a fixed value. In this case, for example, the set value Ps may be a value that is larger than 0% and smaller than 100%, or may be 0%.

As the transmission rate increasing control, the above embodiment has described the tailing control in which the clutch actuator is controlled such that the power transmission rate gradually approaches 100% with time. However, the transmission rate increasing control may be control in which the power transmission rate is rapidly increased to 100% in a step manner. Moreover, an increase rate of the power transmission rate of the tailing control may be changed in accordance with the difference between the rotational frequencies of the pair of contact members of the clutch 18.

In the above embodiment, for example, the timing of the shift control is determined such that the second dog 24 and the second gear 23*b*2 are engaged with each other at a timing at which the difference $\Delta_\omega$ between the rotational frequency of the second dog 24 and the rotational frequency of the second gear 23*b*2 becomes the predetermined value or less. However, the timing of the shift control may be determined such that the second dog 24 and the second gear 23*b*2 are engaged with each other at a timing at which the difference $\Delta_\omega$ becomes zero.

In the above embodiment, both of the gear synchronous control with respect to the engine 12 and the gear synchronous control with respect to the drive motor 13 are executed such that the difference between the rotational frequency of the second dog in the second gear stage and the rotational frequency of the second gear in the second gear stage is reduced. However, the gear synchronous control may be executed for one driving source. For example, the gear synchronous control with respect to the drive motor does not have to be executed. When the gear synchronous control is executed for one driving source, there is a possibility that the second dog 24 and the second gear 23*b*2 are engaged with each other in a state where the difference $\Delta_\omega$ is relatively large. However, even in this case, the gear shift shock can be reduced by reducing the inertia I by the transmission rate reducing control.

In the above embodiment, the engine 12 is controlled such that the clutch synchronous control that reduces the difference between the rotational frequency of the upstream rotating body of the clutch 18 and the rotational frequency of the downstream rotating body of the clutch 18 is executed. However, the drive motor may be controlled such that the clutch synchronous control is executed. The clutch synchronous control is not limited to control in which the rotational frequency of the first driving source-side rotating body of the clutch is made to approach the rotational frequency of the second driving source-side rotating body of the clutch. The clutch synchronous control may be control in which the rotational frequency of the second driving source-side rotating body of the clutch is made to approach the rotational frequency of the first driving source-side rotating body of the clutch. To be specific, after the transmission rate reducing control is executed, the processing circuitry may control the second driving source such that the difference between the rotational frequency of the input shaft-side rotating body of the clutch and the rotational frequency of the first driving source-side rotating body of the clutch is reduced. In this case, it is desirable that the clutch synchronous control executed by controlling the second driving source be started after the gear synchronous control is completed (for example, after the time point t4 in FIG. 6).

Before the second dog 24 and the second gear 23*b*2 are engaged with each other by the shift control, a torque command to the drive motor may be stopped, and the drive motor may be set to a free-run state. Thus, the inertial moment due to the electric motor is reduced, and the apparent inertia I of the driving part that rotates together with the input shaft 21 can be further reduced.

The drive motor 13 that is the second driving source is connected to the input shaft 21. However, a method of connecting the second driving source to the power transmitting path for the first driving source is not limited to this. The second driving source may be connected to a structure located on the power transmitting path for the first driving source and between the input shaft and the driving wheel. For example, the drive motor that is the second driving source may be an in-wheel motor connected to the driving wheel.

The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

Disclosed Aspects

The following aspects disclose preferred embodiments.

First Aspect

A controller of a vehicle,
the vehicle including:
a driving source that generates power;
a driving wheel;
a gear transmission located on a power transmitting path through which the power is transmitted between the driving source and the driving wheel, the gear transmission including an input shaft, an output shaft, and transmission gear pairs each including a transmission gear coaxial with the input shaft and a transmission gear coaxial with the output shaft;
a shift actuator that moves engaging structures engageable with the transmission gear pairs and sets one transmission gear pair, which has been engaged with the engaging structures, among the transmission gear pairs to a power transmitting state;
a clutch that is located on the power transmitting path and between the driving source and the input shaft and changes a power transmission rate of the power transmitted from the driving source to the input shaft; and
a clutch actuator that operates the clutch,
the controller including processing circuitry configured to
when the processing circuitry acquires a shift command by which a first gear stage is shifted to a second gear stage, execute transmission rate reducing control of controlling the clutch actuator such that the power transmission rate is reduced,
after the transmission rate reducing control is executed, execute shift control of controlling the shift actuator such that the transmission gear pair corresponding to the first gear stage and the engaging structures corresponding to the first gear stage are disengaged from each other, and the transmission gear pair corresponding to the second gear stage and the engaging structures corresponding to the second gear stage are engaged with each other, and after the shift control is executed, execute transmission rate increasing control of controlling the clutch actuator such that the power transmission rate is increased.

According to the above configuration, before executing the shift control, the power transmission rate of the clutch is reduced. Thus, the inertial moment of the rotating body connected to the input shaft can be reduced. Therefore, even when there is the difference between the rotational frequency of the input shaft and the rotational frequency of the output shaft in the transmission in a case where the transmission gear pair corresponding to the second gear stage and the engaging structures corresponding to the second gear stage are engaged with each other in the shift control, the shock which may be generated at the vehicle body due to the effect of reducing the inertial moment can be reduced, specifically, the impact between the engaging structure and the transmission gear pair can be reduced.

Second Aspect

The controller according to the first aspect, wherein after the transmission rate reducing control is executed, the processing circuitry controls the driving source such that a difference between a rotational frequency of an input shaft-side rotating body of the clutch and a rotational frequency of a driving source-side rotating body of the clutch is reduced.

According to the above configuration, the driving source is controlled such that the difference between the rotational frequency of the input shaft-side rotating body of the clutch and the rotational frequency of the driving source-side rotating body of the clutch is reduced, i.e., the the difference between the rotational frequencies of the members of the clutch which contact each other is reduced. Therefore, the transmission rate increasing control can be executed in a state where the difference is reduced. Thus, the shock which may be generated at the vehicle body due to the transmission rate increasing control can be reduced.

Third Aspect

The controller according to the first or second aspect, wherein:

the vehicle further includes a second driving source different from a first driving source that is the driving source; and the second driving source is connected to the input shaft or a structure located on the power transmitting path and between the input shaft and the driving wheel such that the power generated by the second driving source is transmitted to the driving wheel without through the clutch.

According to the above configuration, the second driving source is included separately from the first driving source. Therefore, even when the clutch is set to the disengaged state by the transmission rate reducing control, the power can be transmitted to the driving wheel by the second driving source. In this case, the clutch can also be utilized as a power switching device that switches transmitting of the power from the first driving source to the driving wheel. To be specific, both of the power switching function and the shock reducing function at the time of the gear change can be realized by one clutch.

Fourth Aspect

The controller according to the third aspect, wherein:

the first driving source is an internal combustion engine; and the second driving source is an electric motor.

The above configuration is applicable to hybrid vehicles. Moreover, since two driving sources that are different in driving method from each other are used, the driving source that transmits the power to the driving wheel can be changed depending on the situation. Therefore, the driving source appropriate for the situation can be easily adopted.

Fifth Aspect

The controller according to the third or fourth aspect, wherein after the transmission rate reducing control is executed, the processing circuitry controls the second driving source such that a difference between a rotational frequency of an input shaft-side rotating body of the clutch and a rotational frequency of a driving source-side rotating body of the clutch is reduced.

According to the above configuration, even in a state where the transmission rate is reduced by the clutch, the rotational frequency of the input shaft-side rotating member of the clutch can be controlled. Before the transmission rate increasing control, the difference between the rotational frequencies of the contact members of the clutch can be further reduced. Thus, the shock which may be generated at the vehicle body due to the transmission rate increasing control can be reduced.

Sixth Aspect

The controller according to any one of the first to fifth aspects, wherein the processing circuitry controls the clutch actuator such that a period from when the transmission rate reducing control is started until when the transmission rate increasing control is started includes a half-engaged state period in which the power transmission rate is maintained at a set value that is more than 0% and less than 100%.

According to the above configuration, since the half-engaged state period exists in the period from when the transmission rate reducing control is started until when the transmission rate increasing control is started, the power transmitting state between the input shaft-side rotating body of the clutch and the driving source-side rotating body of the clutch is maintained. Thus, the difference between the rotational frequencies of the contact members of the clutch can be reduced, and the shock which may be generated at the vehicle body due to the transmission rate increasing control can be reduced. Moreover, the shock which may be generated at the vehicle body since the transmission gear and the engaging structure separate from each other and contact each other in the rotational direction, i.e., for example, since the dog plays, can be reduced by maintaining the power transmitting state.

Seventh Aspect

The controller according to any one of the first to sixth aspects, wherein while the transmission rate reducing control is executed, the processing circuitry controls the clutch actuator based on a gear ratio of the gear transmission, a rotational frequency of the driving source, required torque required to the driving source, a target rotational frequency of the driving source, or a vehicle speed of the vehicle.

According to the above configuration, the gear shift shock can be changed depending on the situation. For example, when the vehicle body shock is allowed, the gear change control may be executed such that shortening the gear change period is prioritized. Moreover, when the generation of the vehicle body shock is not desirable, the gear change control may be executed such that reducing the vehicle body shock is prioritized, and a time spent for the gear change is increased.

Eighth Aspect

The controller according to any one of the first to seventh aspects, wherein:

the vehicle includes a torque related value sensor that detects a torque related value that is a parameter related to required torque required to the driving source; and the processing circuitry determines a reduced amount of the power transmission rate in the transmission rate reducing control based on the torque related value detected by the torque related value sensor.

According to the above configuration, since the reduced amount of the power transmission rate is determined based on the torque related value related to the required torque required to the driving source, the gear shift shock is easily adjusted to a level allowed by the rider or the like.

Ninth Aspect

The controller according to any one of the first to eighth aspects, wherein the processing circuitry controls the clutch actuator in the transmission rate increasing control such that the power transmission rate gradually approaches 100% with time.

According to the above configuration, a rapid change in the transmission rate per unit time can be prevented, and the shock which may be generated at the vehicle body due to the transmission rate increasing control is easily reduced.

Tenth Aspect

A vehicle including:

the driving source;
the driving wheel;
the gear transmission;
the shift actuator;
the clutch;
the clutch actuator; and
the controller according to any one of the first to ninth aspects.

From the foregoing description, numerous modifications and other embodiments of the present disclosure are obvious to those skilled in the art. Accordingly, the foregoing description is to be construed as illustrative only, and is provided for the purpose of teaching those skilled in the art the best mode for carrying out the present disclosure. The structural and/or functional details may be substantially modified without departing from the scope of the present disclosure.

What is claimed is:

1. A controller for use in a vehicle,
the vehicle including:
a driving source that generates power;

a driving wheel;
a gear transmission located on a power transmitting path through which the power is transmitted between the driving source and the driving wheel, the gear transmission including an input shaft, an output shaft, and transmission gear pairs each including a transmission gear coaxial with the input shaft and a transmission gear coaxial with the output shaft;
a shift actuator that moves engaging structures engageable with the transmission gear pairs and sets one transmission gear pair, which has been engaged with the engaging structures, among the transmission gear pairs to a power transmitting state;
a clutch that is located on the power transmitting path and between the driving source and the input shaft and changes a power transmission rate of the power transmitted from the driving source to the input shaft;
a clutch actuator that operates the clutch; and
a torque related value sensor that detects a torque related value that is a parameter related to required torque required to the driving source,
the controller comprising processing circuitry configured to:
when the processing circuitry acquires a shift command by which a first gear stage is shifted to a second gear stage, execute transmission rate reducing control of controlling the clutch actuator such that the power transmission rate is reduced;
after the transmission rate reducing control is executed, execute shift control of controlling the shift actuator such that the transmission gear pair corresponding to the second gear stage and the engaging structures corresponding to the second gear stage are engaged with each other before a rotational frequency of an input shaft-side rotating body of the clutch and a rotational frequency of a driving source-side rotating body of the clutch become equal to each other;
after the shift control is executed, execute transmission rate increasing control of controlling the clutch actuator such that the power transmission rate is increased; and
determine a reduced amount of the power transmission rate in the transmission rate reducing control based on the torque related value detected by the torque related value sensor.

2. The controller according to claim 1, wherein after the transmission rate reducing control is executed, the processing circuitry controls the driving source such that a difference between the rotational frequency of the input shaft-side rotating body of the clutch and the rotational frequency of the driving source-side rotating body of the clutch is reduced.

3. The controller according to claim 1, wherein:
the vehicle further includes a second driving source different from a first driving source that is the driving source; and
the second driving source is connected to the input shaft or a structure located on the power transmitting path and between the input shaft and the driving wheel such that the power generated by the second driving source is transmitted to the driving wheel without going through the clutch.

4. The controller according to claim 3, wherein:
the first driving source is an internal combustion engine; and
the second driving source is an electric motor.

5. The controller according to claim 1, wherein the processing circuitry controls the clutch actuator such that a period from when the transmission rate reducing control is started until when the transmission rate increasing control is started includes a half-engaged state period in which the power transmission rate is maintained at a set value that is more than 0% and less than 100%.

6. The controller according to claim 1, wherein while the transmission rate reducing control is executed, the processing circuitry controls the clutch actuator based on a gear ratio of the gear transmission, a rotational frequency of the driving source, the required torque required to the driving source, a target rotational frequency of the driving source, or a vehicle speed of the vehicle.

7. The controller according to claim 1, wherein the processing circuitry controls the clutch actuator in the transmission rate increasing control such that the power transmission rate gradually approaches 100% with time.

8. The controller according to claim 1, wherein
in the transmission rate reducing control, the processing circuitry controls the clutch actuator such that the power transmission rate is reduced to a value within a range of 0% or more and less than 100%, and
after the transmission rate reducing control is executed, the processing circuitry controls the driving source such that a difference between the rotational frequency of the input shaft-side rotating body of the clutch and the rotational frequency of the driving source-side rotating body of the clutch is reduced.

9. The controller according to claim 1, wherein
the processing circuitry is configured to selectively execute a clutch gear change mode that is a control mode in which the transmission rate reducing control and the transmission rate increasing control are executed, and
the processing circuitry determines whether to execute the clutch gear change mode in accordance with a command from a user through a user interface.

10. The controller according to claim 1, wherein during the execution of the transmission rate reducing control, the processing circuitry controls the clutch actuator based on a gear ratio of the gear transmission or a vehicle speed of the vehicle.

11. A controller for use in a vehicle,
the vehicle including:
a first driving source that generates power;
a driving wheel;
a gear transmission located on a power transmitting path through which the power is transmitted between the first driving source and the driving wheel, the gear transmission including an input shaft, an output shaft, and transmission gear pairs each including a transmission gear coaxial with the input shaft and a transmission gear coaxial with the output shaft;
a shift actuator that moves engaging structures engageable with the transmission gear pairs and sets one transmission gear pair, which has been engaged with the engaging structures, among the transmission gear pairs to a power transmitting state;
a clutch that is located on the power transmitting path and between the first driving source and the input shaft and changes a power transmission rate of the power transmitted from the first driving source to the input shaft;
a clutch actuator that operates the clutch; and
a second driving source that is different from the first driving source and connected to the input shaft or a structure located on the power transmitting path and between the input shaft and the driving wheel such that the power generated by the second driving source is transmitted to the driving wheel without going through the clutch,
the controller comprising processing circuitry configured to:
when the processing circuitry acquires a shift command by which a first gear stage is shifted to a second gear stage, execute transmission rate reducing control of controlling the clutch actuator such that the power transmission rate is reduced;
after the transmission rate reducing control is executed, execute shift control of controlling the shift actuator such that the transmission gear pair corresponding to the second gear stage and the engaging structures corresponding to the second gear stage are engaged with each other;
after the transmission rate reducing control is executed, execute control of the second driving source such that a difference between a rotational frequency of an input shaft-side rotating body of the clutch and a rotational frequency of a driving source-side rotating body of the clutch is reduced; and
after the shift control is executed, execute transmission rate increasing control of controlling the clutch actuator such that the power transmission rate is increased.

12. A controller for use in a vehicle,
the vehicle including:
a driving source that generates power;
a driving wheel;
a gear transmission located on a power transmitting path through which the power is transmitted between the driving source and the driving wheel, the gear transmission including an input shaft, an output shaft, and transmission gear pairs each including a transmission gear coaxial with the input shaft and a transmission gear coaxial with the output shaft;
a shift actuator that moves engaging structures engageable with the transmission gear pairs and sets one transmission gear pair, which has been engaged with the engaging structures, among the transmission gear pairs to a power transmitting state;
a clutch that is located on the power transmitting path and between the driving source and the input shaft and changes a power transmission rate of the power transmitted from the driving source to the input shaft; and
a clutch actuator that operates the clutch,
the controller comprising processing circuitry configured to:
when the processing circuitry acquires a shift command by which a first gear stage is shifted to a second gear stage, execute transmission rate reducing control of controlling the clutch actuator such that the power transmission rate is reduced;
after the transmission rate reducing control is executed, execute shift control of controlling the shift actuator such that the transmission gear pair corresponding to the second gear stage and the engaging structures corresponding to the second gear stage are engaged with each other before a rotational frequency of an input shaft-side rotating body of the clutch and a rotational frequency of a driving source-side rotating body of the clutch become equal to each other; and after the shift control is executed, execute transmission rate increasing control of controlling the clutch actuator such that the power transmission rate is increased, wherein in the transmission rate reducing control, the processing circuitry controls the clutch actuator such that a reduced amount of the power transmission rate when required torque required to the driving source is larger becomes smaller than a reduced amount of the power transmission rate when the required torque is smaller.

\* \* \* \* \*